United States Patent [19]

Callies

[11] 4,020,651
[45] May 3, 1977

[54] TELESCOPING DRIVE LINE

[75] Inventor: Fritz A. Callies, Menomonee Falls, Wis.

[73] Assignee: Rexnord Inc., Milwaukee, Wis.

[22] Filed: July 3, 1975

[21] Appl. No.: 593,132

[52] U.S. Cl. .................. 64/23; 64/11 R; 64/27 NM; 64/1 V; 74/492

[51] Int. Cl. .......................................... F16d 3/06

[58] Field of Search ............ 64/23, 27 NM, 11 R, 64/1 V; 74/492

[56] References Cited

UNITED STATES PATENTS

| | | |
|---|---|---|
| 2,174,223 | 9/1939 | Frauenthal et al. .............. 64/23 |
| 2,198,654 | 4/1940 | Calkins et al. ................... 64/23 |
| 2,761,296 | 9/1956 | Baker ......................... 64/27 NM |
| 3,066,503 | 12/1962 | Fleming et al. .................... 64/23 |
| 3,400,558 | 9/1968 | Haines ................................ 64/23 |
| 3,714,841 | 2/1973 | Grosseau ......................... 74/492 |

*Primary Examiner*—Samuel Scott
*Assistant Examiner*—Randall Heald
*Attorney, Agent, or Firm*—Sughrue, Rothwell, Mion, Zinn & Macpeak

[57] ABSTRACT

A telescopic drive line includes an inner square drive shaft and an outer drive tube having a square bore at one end. A liner in the bore has a Teflon fabric inner surface providing a low-friction bearing with a low breakaway force. Radial force applied to the liner secures it axially in this bore so that only the simplest means of endwise securement is required.

9 Claims, 8 Drawing Figures

U.S. Patent
May 3, 1977
4,020,651
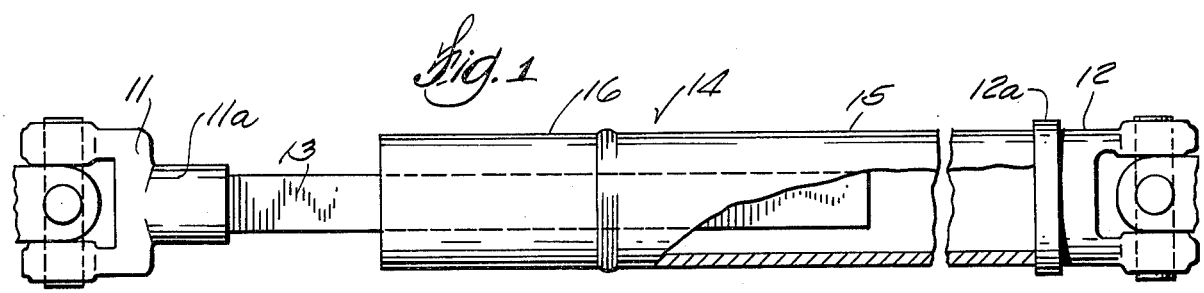
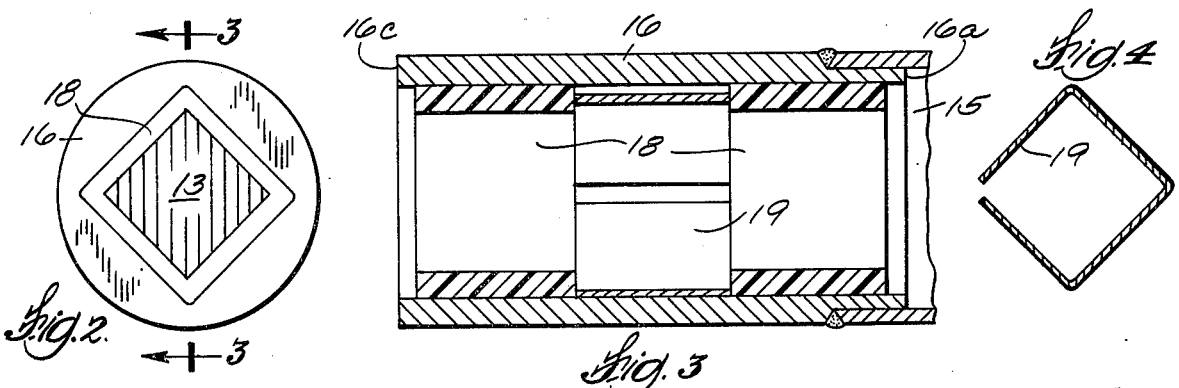
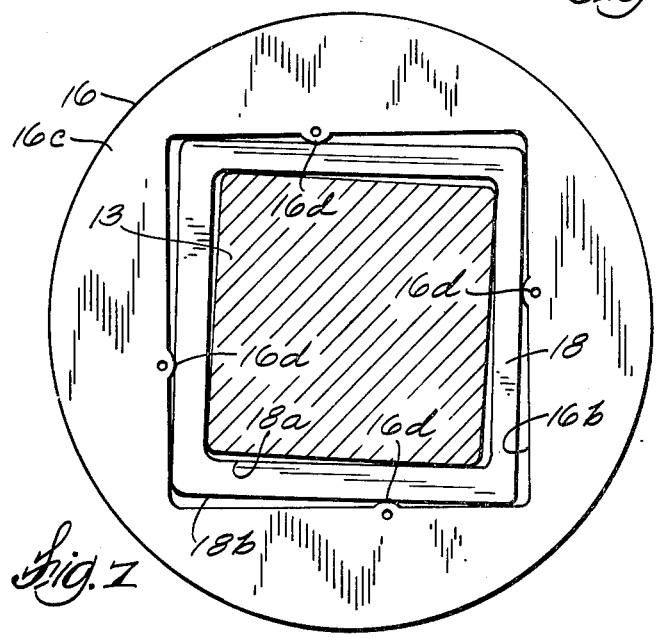
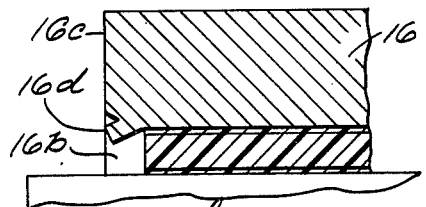
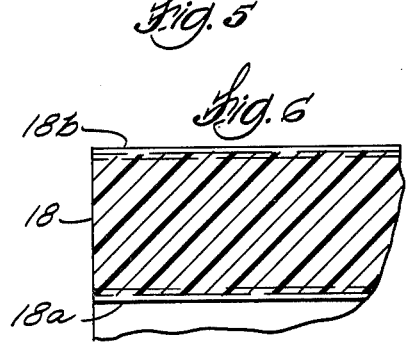
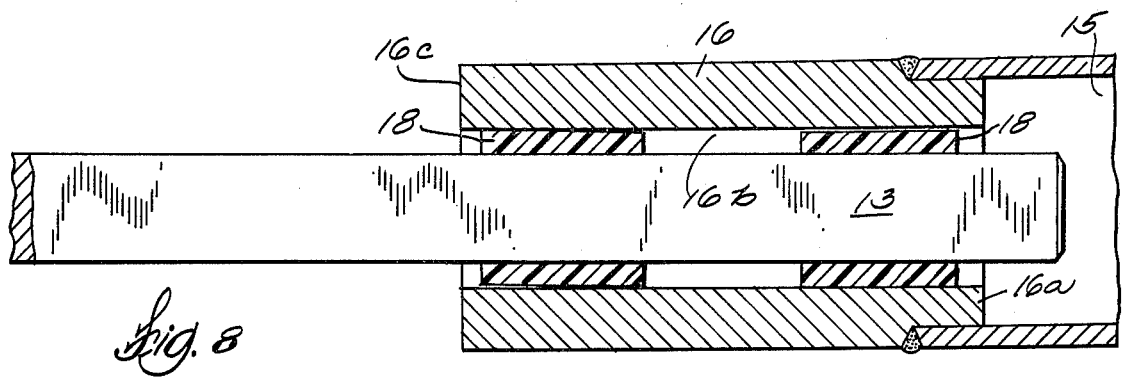

TELESCOPING DRIVE LINE

BACKGROUND OF THE INVENTION

A telescoping drive line generally is used to transmit rotational force between two relatively moving machines. It includes an inner shaft or member of uniform non-circular section and an outer shaft or tube which includes at least in part a sleeve in which the inner shaft or member is slidable. The resistance of the two parts to relative axial movement while they are under a given torque load is usually a most important criterion or design limitation. The force which is resisted is referred to as the thrust load and in many instances the maximum allowable thrust load is dictated by the sturdiness of the two machines. As an example, a 1,500 pound maximum thrust load for drive shafts is recommended for farm machinery. In other instances the maximum thrust load may be prescribed as a function of the torque load.

The bearing in which the inner member is slidable may be of the anti-friction type which includes for example several series of recirculating balls or rollers. Such bearings, however, are relatively expensive and require good lubrication and protection from abrasive dirt. The usual drive line is of the lubricated type. However, the enclosures and shielding required for drive lines somewhat complicate the provisions for lubrication and especially prevent observation of the inner member for indications that lubrication is required.

The typical drive line in which the present invention is especially useful, connects the power take-off shaft of the farm tractor and the drive shaft of the agricultural machine drawn thereby. Such a drive line is almost totally enclosed and incidentally is to a degree protected from dirt and the like. Such a drive line usually includes as well, a universal joint at each end. Customarily each is a Hooke's joint and the two joints are rotationally in phase so that the entire assembly functions as a Cardan joint. As is well known in such a Cardan joint where both Hooke's joints are of equal angularity and their axes are all in similar planes, the pulses are of opposite effect and the relative velocity of the input and output ends of the drive line is substantially constant.

Numerous efforts have been made to apply a Teflon fabric liner to the sleeve of such a drive line, but without commercial success for several reasons.

As is well known, Teflon fabric provides a low friction bearing surface and is uniquely self-lubricating. However, applying Teflon fabric directly to the drive line sleeve presents great difficulties which have been overcome by utilizing a bearing liner which has itself been formed over the Teflon fabric while it is supported on a mandrel of the same dimensions as the shaft which is to be axially slideable therein.

This liner can be bonded in the bearing but it is then not replaceable in the field. More importantly, attempts to secure the liner in the sleeve may result in some failure of the securement means or of the liner due to stress concentrations.

A particular difficulty is presented also by the axial endwise securement of the liner in the bearing so that it is readily replaceable if required. On the other hand, removable abutment means at each end can be provided, but it has been thought that such means must be adequate to secure the liner against the endwise force which may cause the liner to move from the bearing. It is an object of the present invention to provide a readily replaceable liner. Since any endwise retainer that is used must be equally readily replaceable as well, it is an object of the invention to allow the use of any readily replaceable retainer.

SUMMARY OF THE INVENTION

The steel slip sleeve of a telescopic drive line is provided with a replaceable liner which defines the low friction sliding surface of the sleeve. Their relative movement can, of course, only be axial. The outer body of the liner has a relatively high coefficient of friction which allows the use of any of several light-weight retaining means which are readily removable or may be distended for replacement of the liner. This is made possible by the fact that the liner, even though mechanically unsecured in the axial direction, is always frictionally secured adequately either by the torque applied to the drive line or the sag in the drive line when it is not operating. The liner may be unitary or an assembly of two liners with an intermediate spacer.

BRIEF DESCRIPTION OF THE SEVERAL VIEWS OF THE DRAWINGS

FIG. 1 shows a typical drive line with a universal joint at each end. The parts of the universal joints which are connected to the drive and driven shafts of the machines (not shown) are broken away and sectioned.

FIG. 2 is an end view of the bearing sleeve at one end of the outer drive line member and of the liner assembly inserted within the sleeve; the inner drive line member is shown in section. The drive line has been turned 45° respecting that shown in FIG. 1.

FIG. 3 is a cross-section taken on line 3—3 of FIG. 2 of the sleeve and liner assembly and a part of the outer drive tube.

FIG. 4 is an end view of the spacer of the liner assembly.

FIG. 5 is an enlarged section of a portion of the end of the sleeve to show one manner of retaining the insert in the bearing sleeve.

FIG. 6 is enlarged section of the liner.

FIG. 7 is an enlarged end view of the bearing sleeve and liner; the inner drive line member is shown in cross-section. The clearances between the parts are greatly enlarged in order to show the coupled rotational forces which locate the liner in the sleeve and the inner member in the liner when the drive line is operating. The relatively modest endwise securement of the liner which is required is also shown.

FIG. 8 is a longitudinal cross-section of a part of the drive line; the clearances between the parts are greatly enlarged to show the coupled forces which support the drive line while it is not operating. The clearances allow a sag which is greatly exaggerated as shown.

DESCRIPTION OF THE PREFERRED EMBODIMENT

The telescoping drive line shown in the drawing is provided with the universal joints 11 and 12 and includes the square inner shaft 13 and the tubular outer shaft 14. Shaft 13 is 600 mm long and is 32 mm by 34 mm or nearly square in section. These and other dimensions which will be given, are of course, strictly and only typical.

Shaft 13 is not exactly square for what is called phasing purposes, as will be desccribed. It is of solid steel construction and should be ground and plated to have a smooth, corrosion-resistant sliding surface. One end of shaft 13 is welded to the hub 11a of universal joint 11.

The outer shaft 14 comprises the seamed or seamless tube 15, the sleeve 16 and liner assembly which appears in FIG. 3. Sleeve 16 is of solid steel round stock and need be only a little longer than liner assembled 17. The end 16a of sleeve 16 is welded to one end of the tube 15; the other end of tube 15 is welded to the hub 12a of universal joint 12. End 16a of sleeve 16 is provided with means, not shown, for retaining the liner assembly preferably before it is welded to tube 15. This will be described in detail hereinafter.

Liner assembly 17 consists of the two liners 18 and the intermediate spacer 20. Spacer 20, for example as shown, is a cut piece of 16 guage galvanized soft steel sheet which has been bent to form a square and to fit loosely in the bore 16b of sleeve 16.

Only ordinary tolerances which are readily maintained as to shaft 13, the broached bore 16b and liners 18 are required. For example, their dimensions should allow up to but not over 0.1 mm maximum clearance between shaft 13 and the inner surfaces of the liner and between the outer surfaces of the liners and bore 16b of the sleeve.

Accordingly, the inner bore 16b of sleeve 16 is of a size which allows liners 18 to be inserted endwise with a slip-fit or a slide fit. Each liner is in the form of a square tube having a wall thickness of about 4mm and is typically 38mm long. Their length is important to providing adequate bearing area for shaft 13 and their over-all spacing or length is also important in supporting the drive line.

For phasing purposes, liners 18 can be inserted endwise in bore 16b as shown or in a position turned 180° about their axis; shaft 13 can similarly be inserted in the liners as shown or when turned 180°. These limitations are due to the fact that shaft 13, the liners 18 and bore 16b are not quite square and the phase relationship of universal joints 11 and 12 are thus maintained.

Each liner 18 is of a composite construction and the liners are preferably identical. With response to liner 18 shown in FIG. 6., the liner has, of course, adequate compressive strength and impact resistance; the inner facing 18a of the liner has good wear resistance and self-lubricating properties, a low coefficient of friction and a low breakaway force. In the presently preferred embodiment of the invention, the body of liner 18 is of a glass filament reinforced resin and the inner facing 18a is a Teflon woven fabric which is embedded in the resin of the body. The glass filaments extend to the outer surface 18b of the liner so that the coefficient of friction of the outer surface 18b with the steel sleeve 16 is thus at least 0.3 whereas the coefficient of friction of the inner surface 18a of liner 18 with the steel square inner shaft 13 is less than 0.1. The latter coefficient of friction is, of course, in the order of that which is required so that the 1500 pounds of axial thrust is not exceeded at the maximum torque loads for which this limit is applicable. The coefficiennt of friction between surface 18b and that of bore 16b of sleeve 16 which is three times that amount is considered more than adequate to provide a wide margin for any variables. One such variable would be the misintentioned or unintended lubrication of the bore 16b. The actual coefficient of friction between surface 18b and the surface of bore 16b of sleeve 16 has been found to be near 6 times the coefficient of friction of the inner surface 18a of liner 18 with the steel square inner shaft 13. This was found in testing a sleeve and liner of the type described herein.

The nominal mechanical securement of liner assembly endwise in sleeve 16 is all that is required according to the present invention. That is, the axial securement of liners 18 against their movement with shaft 13 by frictional engagement of the shaft with their inner surfaces under a given operating condition is more than offset by their frictional securement within bore 16b under the same operaing condition, including rotation in either direction or no rotation.

As shown, each end 16a and 16c of sleeve 16 is staked with a sharp punch, not shown, so that a very slight amount of the metal of sleeve 16 is coined as at 16d in FIGS. 5 and 6 to project into the bore 16b. The end 16a of sleeve 16 which is welded to tube 15 is, of course, similarly staked before such welding. This staking substantially as shown, is more than adequate to secure liners 18 endwise. On the other hand, the small amount of metal at 16d can be pounded, ground or filed away very easily for removal of the liner.

In normal operation of the drive line, either end may be the driving end, the other end being the driven end; the opposite rotational forces between shaft 13 and liners 18 and between the liners and sleeve 16 represent the torque load. The relative rotational motion between shaft 13 and sleeve 16 which is allowed by the dimensional tolerances as described is referred to as the wind-up. This wind-up is shown in a representative manner in FIG. 7. The resistance to sliding motion between shaft 13 and liners 18 varies, of course, with the torque load referred to. This may be referred to as the shaft to liner slip-torque ratio. The present invention relies on the resistance to sliding motion between liners 18 and sleeve 16 and the fact that such resistance always increases with any increase in the torque load.

As illustrated in FIG. 7 with the "windup" of shaft 13 in sleeve 16, the rotationally forward-moving portions of the shaft press against corresponding portions of the liners annd similar portions of the outer surfaces of the liners press against corresponding portions of bore 16b. That is, the forces which are diametrically opposite respecting the drive line axis are coupled to effect rotation. While the amount of such pressure in terms of unit area may be considered equal, the coefficients of friction of the two portions as referred to (shaft 13 and surface 18a; outer surface 18b and bore 16a), are such that the liners 18 cannnot and will not move from whatever position it has in bore 16a.

FIG. 8 diagrammatically illustrates the coupled forces which support the drive line while it is not operating. That is for example while the farm machine is drawn to or from the field the shaft 13 must be able to reciprocate axially in the liners 18 without rotation. Under such conditions, the only axial forces involved are due to the weight of the drive line and the clearances between shaft 13, liners 18 and sleeve 16 allow what would be a slight sag in the drive line. Under such conditions, shaft 13 pushes one liner 18 upwardly. As shown the liner being pushed upwardly is the one nearer end 16c of sleeve 16 and is secured axially by the frictional engagement of surface 18b of this liner with the surface of bore 16b. The other liner 18 which is pushed downwardly is similarly secured against the axial force which is due to the frictional resistance to movement of shaft 13 in the liner. In both the operating and non-operating conditions, coupled forcces thus keep both liners 18 in position.

Upon disassembly of the drive line by removing shaft 13, the liners 18 can thus be readily replaced, in fact, in most instances the service life of the liners can be once extended by reversing each end for end. That is, in most instances the drive line torque is in one direction only and the reverse torque such as would be due to the drag of the engine is usually eliminated by a one-way clutch not shown in the power train. Accordingly, the relatively unworn portions of the liner replace the worn portions upon endwise reversal of the liner. Inasmuch as the liner 18 nearer the exposed end 16c of sleeve 16 is subject to greater wear, the two liners may be interposed as well as individually reversed.

When liners 18 and 19 have been reversed or replaced, the end 16c of sleeve 16 is, of course, restaked alongside the location of the previously removed staking. Spacer 19 may be reused indefinitely. After a period of normal service the liners 18 will be somewhat tight rather than loose in bore 16b of sleeve 16. In practice, the sleeve 16 "rusts tight" around the liners 18 faster than the liners might be thought to become loose in bore 16b due to wearing of their outer surfaces 18b. That is, if sleeve 16 is of ordinary steel, as mentioned, and assuming that corrosion is an acceptable condition, the endwise motion of shaft 13 in tube 15 and the slight motion of liner 17 in sleeve 16 with "windup" and similar reverse motion will assure that air-borne moisture reaches the surface of bore 16b surrounding liners 18; that such moisture will provide fair to good conditions for rusting; and that the resultant ferrous oxide between the sleeve and the liner will provide a remarkably good mechanical securement of the liner in the sleeve in the manner which would normally be negatively regarded.

Liners which have been in place for an extended period of service can be removed by hand from the sleeve with a suitable tool but not without some effort. Upon removal, the outer surfaces appeared to have no wear whatever and were in fact thoroughly covered with embedded rust.

OTHER PREFERRED EMBODIMENTS

The shaft 13 annd bore 16b are square, which is most common for farm machinery. However, insofar as the present invention is concerned, any other noncircular cross-section which is uniform to allow axial movement would be suitable, but might be less practicable.

Also, the liner assembly may be of a unitary construction or may comprise a single liner of suitable length. The liner or liners may be of any construction within the scope of the claims of this application.

Where the self lubricated surfaces 18a of liners 18 are of Teflon, the shaft 13 should be corrosion resistant and have a surface finish in the range of 10–60 microinches. The lower limit here is generally the maximum smoothness which is practicable in manufacture. Incidentally also, the shaft 13 only wears to such smoothness because of the imperfections in the grain structure of the metal. The maximum limit is, of course, very critical. Roughness of the shaft greatly increases the wear rate of the liners, as is well known, and causes premature bearing failure.

I claim:

1. In a telescoping drive shaft assembly comprising an outer member having a noncircular axial bore, a noncircular inner member, and a liner having a sliding fit within the bore of said outer member and having an axial bore in which said inner member fits and is axially slidable, said liner including (1) an outer body which is of a material having a relatively high coefficient of friction with the outer member of at least 0.3 and (2) and inner facing which defines the inner bore of the bushing and which is of a material having a relatively low coefficient of friction with the inntter member of less than 0.1 such that the axial securement of the bushing in the outer member is provided by their frictional engagement effected by the torque loads applied thereto.

2. The assembly of claim 1 wherein the respective materials of the members and of the liner have coefficients of friction such that a torque load increase provides at least a corresponding increase in the axial displacement differential, said differential being the axial force required to effect relative axial movement of the liner and the outer member less the axial force required to effect axial relative movement of the inner member and the liner.

3. The assembly of claim 1 wherein the outer member is of steel, the outer body of the liner has a compressive strength which is less than that of the outer member and the material of the inner facing of the liner has a compressive strength which is less than that of the outer body of the liner.

4. The assembly of claim 3 wherein the inner facing of the liner is of a self-lubricating material which provides its own lubricating film.

5. The assembly of claim 4 wherein said self-lubricating material comprises Teflon fibers.

6. The assembly of claim 1 wherein at least the outer surface of the non-circular inner member is corrosion resistant.

7. The assembly of claim 5 wherein said surface has a finish in the range of 10–60 microinches.

8. The assembly of claim 1 which further includes a Cardan joint at each of the respectively remote ends of the inner and outer members and wherein the cross sections of the inner member and the inner bore of the liner and the cross sections of the liner and the inner bore of the sleeve are both such that the inner and outer members may be relatively repositioned only 180° with respect to their axes whereby only the relative phasing of the Cardan joints is allowed.

9. In a telescoping drive shaft assembly such as for farm machinery comprising an outer steel member having a non-circular axial bore, a non-metallic liner having a sliding fit within the bore of said outer member and having an axial bore in which said inner member fits and is axially slidable, said liner including (1) an outer body which is of a material having a relatively high coefficient of friction with the outer member of at least 0.3 and (2) an inner facing which defines the inner bore of the bushing and which is of a material having a relatively low coefficient of friction with the inner member of less than 0.1 such that the axial securement of the bushing in the outer member is initially provided adequately by their frictional engagement effected by the torque loads applied thereto and thereafter as well as by the securement which develops in service such as through normal rusting of the sleeve.

* * * * *

UNITED STATES PATENT AND TRADEMARK OFFICE
CERTIFICATE OF CORRECTION

PATENT NO. : 4020651

DATED : May 3, 1977

INVENTOR(S) : Fritz A. Callies

It is certified that error appears in the above-identified patent and that said Letters Patent are hereby corrected as shown below:

Column 4, line 42, "annd" should be --and--.

Column 6, line 52, after "bore," insert --a non-circular inner member, and --.

Signed and Sealed this

Tenth Day of July 1979

[SEAL]

Attest:

Attesting Officer

LUTRELLE F. PARKER

Acting Commissioner of Patents and Trademarks